United States Patent
Hága et al.

(10) Patent No.: US 12,306,620 B2
(45) Date of Patent: May 20, 2025

(54) OBJECT HANDLING IN AN ABSOLUTE COORDINATE SYSTEM

(71) Applicant: Telefonaktiebolaget LM Ericsson (PUBL), Stockholm (SE)

(72) Inventors: Péter Hága, Budapest (HU); Zsófia Kallus, Budapest (HU); Zsolt Kenesi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 525 days.

(21) Appl. No.: 17/772,668

(22) PCT Filed: Oct. 31, 2019

(86) PCT No.: PCT/EP2019/079903
§ 371 (c)(1),
(2) Date: Apr. 28, 2022

(87) PCT Pub. No.: WO2021/083529
PCT Pub. Date: May 6, 2021

(65) Prior Publication Data
US 2022/0390931 A1    Dec. 8, 2022

(51) Int. Cl.
G05B 19/00    (2006.01)
G01C 21/20    (2006.01)
G05B 19/418   (2006.01)

(52) U.S. Cl.
CPC ..... *G05B 19/41895* (2013.01); *G01C 21/206* (2013.01); *G05B 2219/31286* (2013.01)

(58) Field of Classification Search
None
See application file for complete search history.

(56) References Cited

U.S. PATENT DOCUMENTS

| 9,926,138 | B1 * | 3/2018 | Brazeau | B25J 5/007 |
| 2016/0132059 | A1 | 5/2016 | Mason et al. | |

(Continued)

FOREIGN PATENT DOCUMENTS

WO    2019 046962 A1    3/2019

OTHER PUBLICATIONS

PCT International Search Report issued for International application No. PCT/EP2019/079903—Jun. 30, 2020.

(Continued)

*Primary Examiner* — Paul B Yanchus, III
(74) *Attorney, Agent, or Firm* — Sonoda & Kobayashi Intellectual Property Law; Sarvajit S. Patil (57) ABSTRACT

A method for controlling a handling of a further object (90) which is handled at a site (10) by at least two different workstations (51, 52) and which is moved between the at least two different workstations, —determining a site plan of the site (10), the site plan indicating the at least two workstations at predefined positions in the site plan, —determining a trajectory of a first object (90) moving in the site (10) in an absolute coordinate system of the site, —deducing absolute positions of the at least two workstations (51, 52) in the absolute coordinate system from the determined trajectory of the first object, —using the absolute positions of the at least two workstations (51, 52) for controlling the handling of the at least one further object handled by the at least two workstations.

20 Claims, 7 Drawing Sheets

(56) References Cited

U.S. PATENT DOCUMENTS

2018/0252536 A1 9/2018 Dorum
2018/0306587 A1 10/2018 Holz

OTHER PUBLICATIONS

PCT Written Opinion of the International Searching Authority issued for International application No. PCT/EP2019/079903—Jun. 30, 2020.

* cited by examiner

OBJECT HANDLING IN AN ABSOLUTE COORDINATE SYSTEM

PRIORITY

This nonprovisional application is a U.S. National Stage Filing under 35 U.S.C. § 371 of International Patent Application Serial No. PCT/EP2019/079903 filed Oct. 31, 2019 and entitled "OBJECT HANDLING IN AN ABSOLUTE COORDINATE SYSTEM" which is hereby incorporated by reference in their entirety.

TECHNICAL FIELD

The present application relates to a method for controlling a handling of objects which are handled at a site by at least two different workstations and which are moved between the at least two workstations. Furthermore, the corresponding object control entity is provided, a computer program and a carrier comprising the computer program.

BACKGROUND

Indoor positioning systems are used for various tasks in industrial domain, like high value asset or product tracking, or to ensure safety by tracking of vehicles and humans moving near to each other, etc. These positioning systems might be based on WiFi, Bluetooth, UWB, or 3GPP (LTE, 5G) radio technologies, but most of them require an infrastructure installation that consist of anchor devices with already known absolute positions and tag devices with unknown positions to be measured and used in industrial control command generation. In such systems, the goal is to calculate the absolute position of the tag devices in order to generate meaningful control commands. This is done by using some radio communication and measurements, such as directly measuring the distance between anchors and tag device (e.g. UWB based systems) or to measure the radio signal strength index (RSSI) (e.g. Bluetooth based solutions).

Device positioning and mapping of routes are mostly referred to as autonomous vehicles navigating through a factory using special guidelines intended to be followed as their predefined, dedicated trajectories.

Industrial control systems can use location information on different levels of the control logic. E.g., in the case of a robotic arm instructed to pick up a moving object, one would define high-level commands using the map locations. Here, the precision of a target point to be reached from current arm position could directly affect feasibility of the task. On the other hand, the robotic arm internal command logic could be deployed thorough communication between a dedicated arm controller unit and the arm joints. A feasible trajectory of the arm endpoint would be calculated to reach target, and it would be described as a series of precise, high-frequency, e.g., one per every 40 ms, joint acceleration commands.

In addition, continuous monitoring could provide feedback for various use cases where "position" as such would create the necessary insight, like object-object relational information, 3D trajectory in space, occupancy information of workstations, autonomous vehicles route planning, etc. In most of these use cases spatial resolution and matching of position to an absolute site map and to production line elements (e.g., workstations and site-specific installations) are necessary.

With the progress of Industry 4.0 solutions, flexible manufacturing sites are becoming the more efficient way of using these sites, with production line elements frequently reorganized according to dynamically changing new plans. In today's reorganization process, a new plan is created with an exact map, and the production lines are built based on the drawings with an accuracy necessary to their functioning. There are cases, where the relative position of the production line elements is important, but the placement of the production line within the site can tolerate larger mismatch, without losing functionality.

Although many solutions use ML (Machine Learning) to create outdoor or indoor maps of the environment or perform classic map matching to improve precision of position measurements, here we are focusing on a more specific industrial problem.

Figure 1:
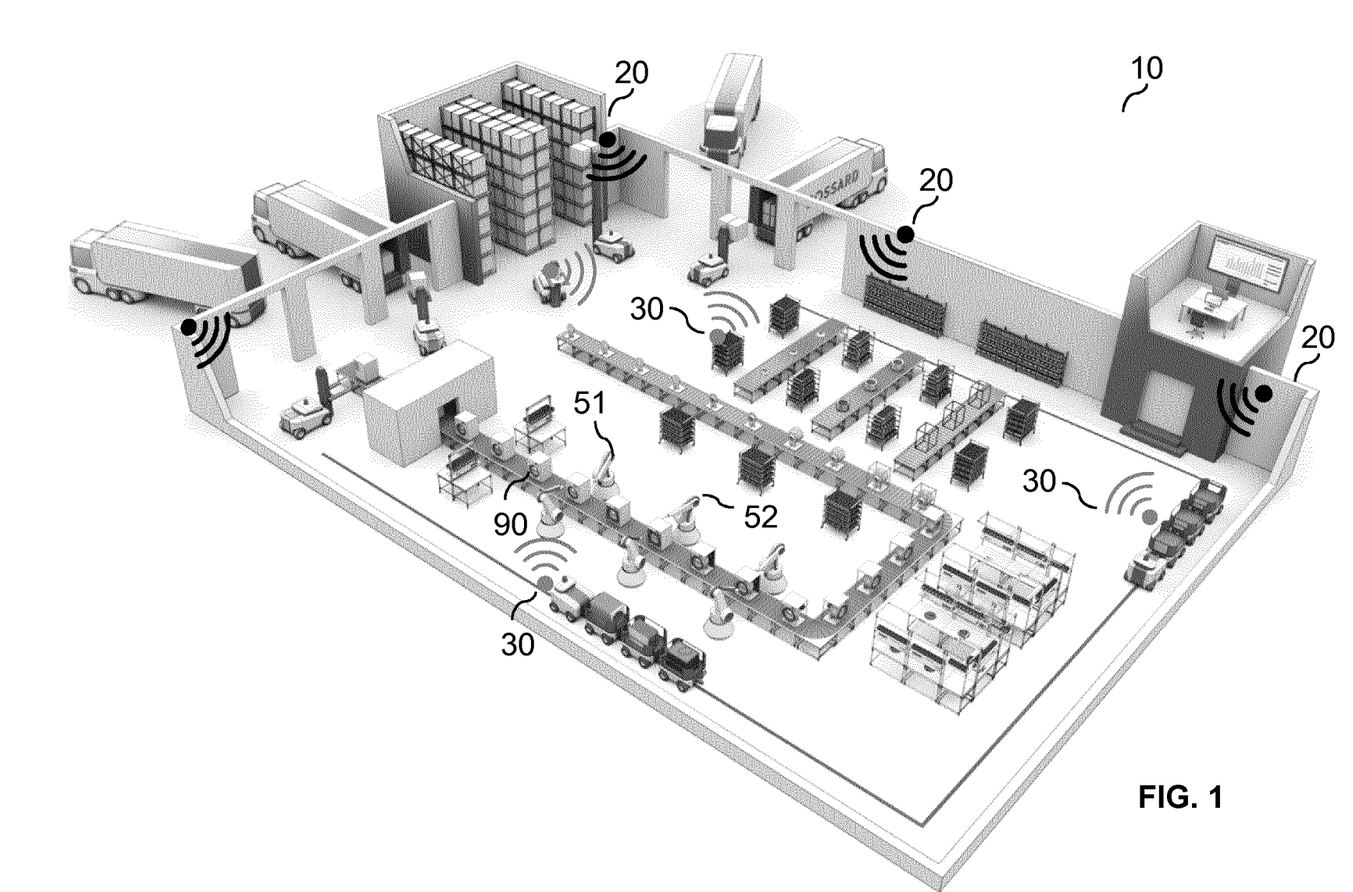
FIG. 1 shows a schematic view of an industrial site with a localization system as known in the art.

As shown in FIG. 1, indoor localization systems use anchor devices with known positions to calculate position of tag devices 30. For an industrial site, an installation of a permanent system of anchors 20 will use an absolute site coordinate system. Tag device positions will be calculated in this coordinate system with high precision.

Figure 2:
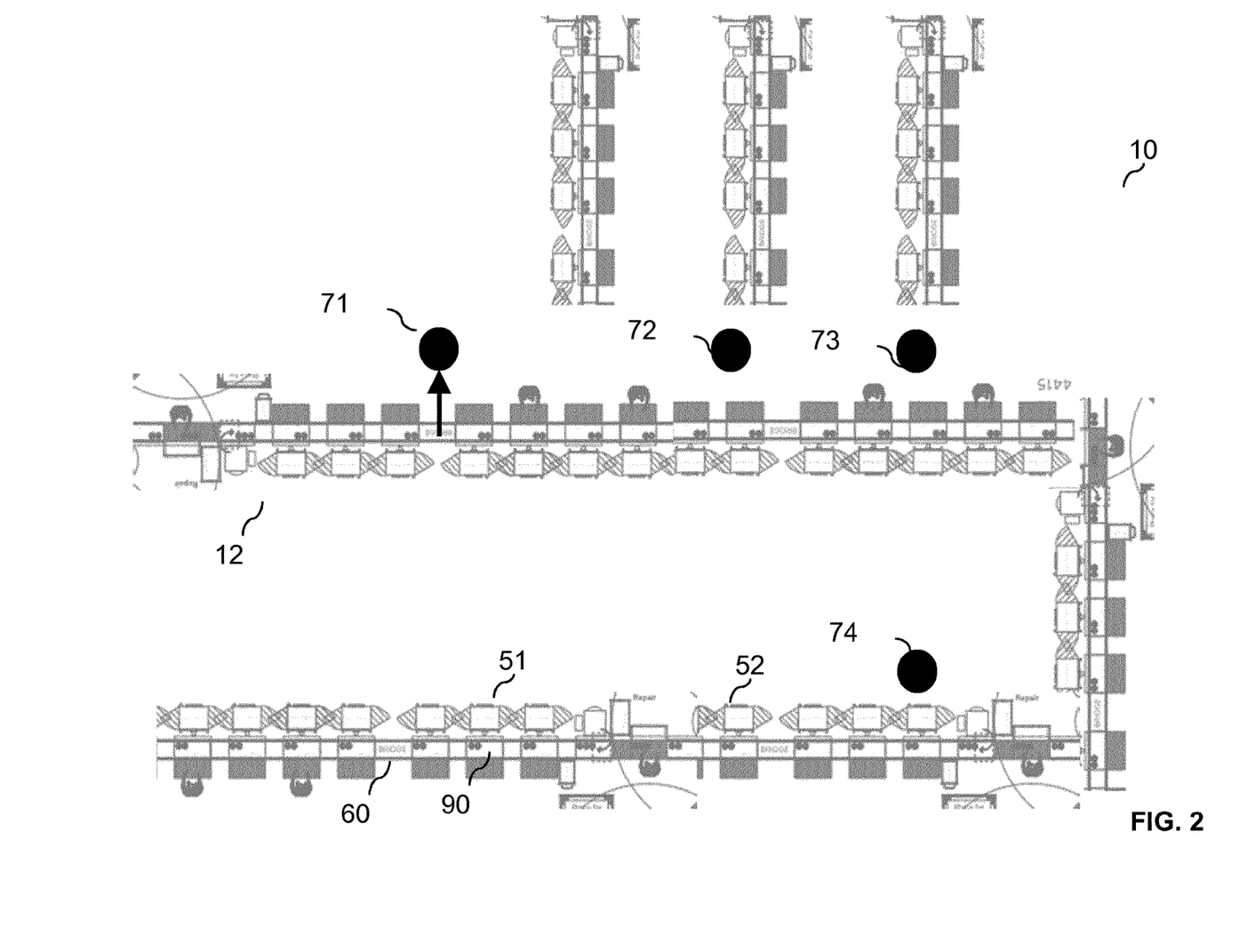
FIG. 2 shows a schematic view of a site plan in which the absolute positions of the objects are wrongly indicated in view of the low precision of the site plan.
Figure 3:
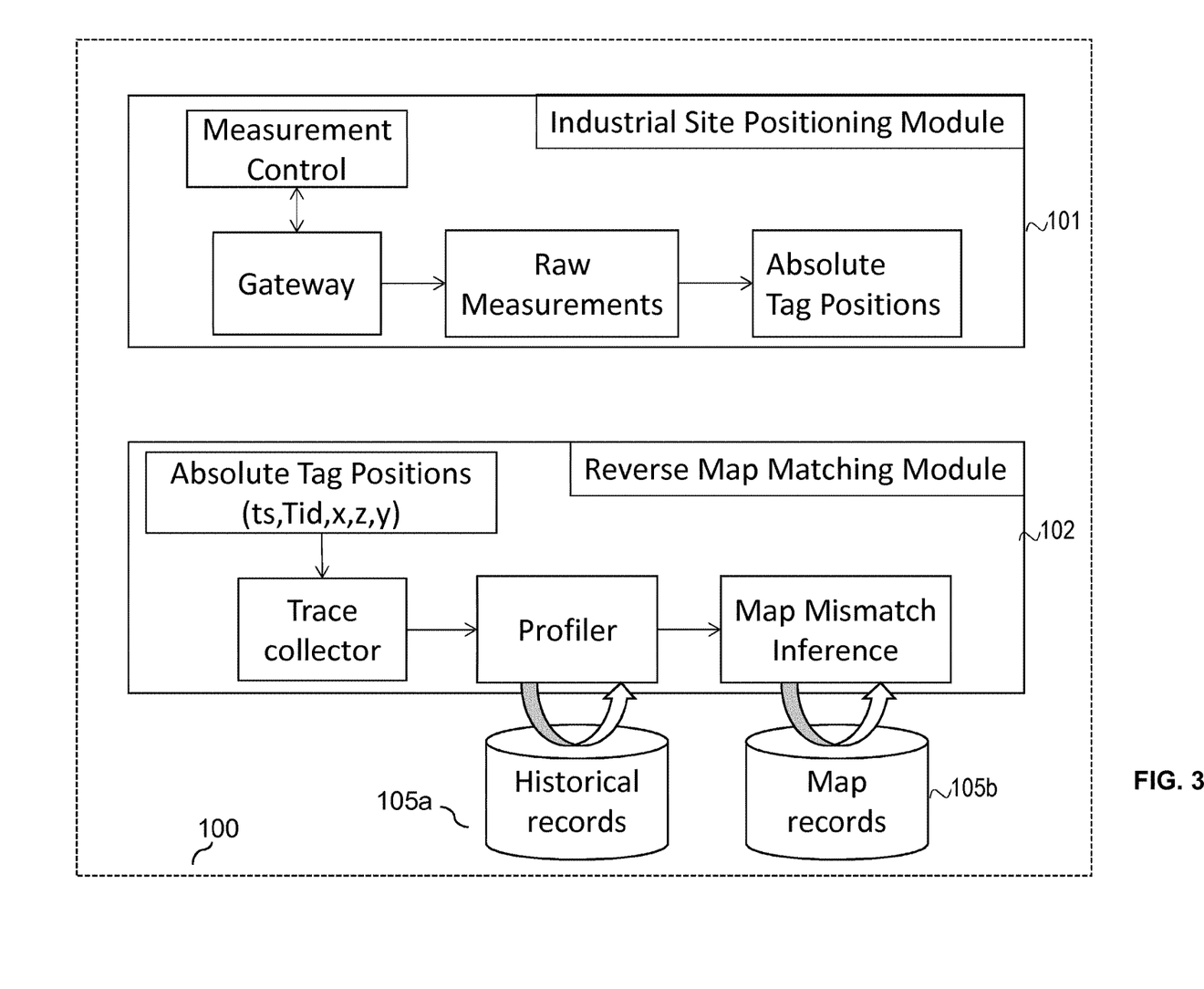
FIG. 3 shows a schematic architectural view of an object control entity which is configured to use an adapted site plan using an absolute coordinate system for controlling the handling of objects.

On the other hand, control-based use cases are typically defined locally, relative to the equipment (e.g., a robotic arm). This means that building a new site configuration according to a given site plan will only need to respect local precision (e.g., within a conveyor belt zone) and the factory can remain fully functional without respecting overall building precision (e.g., placement of two separate conveyor belts relative to each other). As shown in FIG. 2, this can frequently result in a mismatch between the floor plan 10 and the physical location of equipment ensembles. E.g., a single production line 12 with components or workstations 51 and 52 like robotic arms and a conveyor belt 60 can respect internal placing with high precision, but each production line could be all together placed a few decimeters shifted from their respective site plan positions. This is shown in FIG. 2. If a mismatch exists between cloud map and physical placement of production line elements 71 to 74, a false view is created, and either localization problem or manufacturing malfunction would be falsely reported.

The mismatch between map 10 and physical positions 71 to 74 prohibits the direct use of location measurements as an input for control functions—even if the localization precision itself is suitable for the control function. Triggering control commands based on location and motion measurements containing system-level bias could result in malfunction, false alarms, missed alert situations and overall hazard factor would be introduced.

With the appearance of flexible installations, all the elements reorganized according to new site plans would repeatedly become uncertain parts of the analytics system relying on indoor positioning. For a full or partial rebuilding of a flexible site, precise rebuilding and global corrections can be costly and time consuming, causing extended production down time.

SUMMARY

Accordingly, a need exists to overcome the above-mentioned problems and to provide a possibility to exactly locate and control objects moving in a site with high precision.

This need is met by the features of the independent claims.

Further aspects are described in the dependent claims.

According to a first aspect, a method for controlling a handling of a further object is provided which is handled at a site by at least two different workstations and which is moved between the at least two workstations. An object control entity controls the handling including determining a site plan of the site, wherein the site plan indicates the at least two workstations at predefined positions in the site plan. Furthermore, a trajectory of a first object moving in the site is determined in an absolute coordinate system of the site. Furthermore, absolute positions of the at least two workstations are deduced in the absolute coordinate system from the determined trajectory of the first object and the absolute positions of the at least two workstations are used for controlling the handling of the at least one further object handled by the at least two workstations.

Furthermore, the corresponding object control entity is provided configured to control the handling of objects, wherein the object control entity comprises a memory and at least one processing unit, wherein the memory contains instructions executable by the at least one processing unit. The object control entity is operative to work as discussed above or as discussed in further detail below.

Alternatively, an object control entity is provided configured to control the handling of objects at a site by at least two different workstations, wherein the objects are moved between the at least two different workstations, wherein the control entity comprises a first module configured to determine a site plan of the site, wherein the site plan indicates the at least two workstations at predefined positions in the site plan. A second module is provided configured to determine the trajectory of a first object moving in the site in an absolute coordinate system and a third module is provided configured to deduce the absolute positions of the at least two workstations in the absolute coordinate system based on the determined trajectory of the first object. The control entity comprises a fourth module configured to use the determined absolute positions of the at least two workstations for controlling the handling of at least one further object handled by the at least two workstations.

Additionally, a computer program comprising program code is provided, wherein execution of the program code causes the at least one processing unit to execute a method as discussed above or as explained in further detail below.

Further, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF DRAWINGS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function in general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following, a solution is proposed which solves a specific industrial problem. An entity and a method is provided of automatic reverse map matching in order to enable precise location system integration into industrial site monitoring and control functions. The entity and the method rely on the site map. Once a mismatch between the site map and the real, physical layout of the production lines including workstation and conveyors occurs, a compatibility issue between the positioning system and the control functions occurs. In the following, a mechanism is proposed to automatically infer the correction of this mismatch.

The proposed method and device use localization and sensor measurement traces of the site as input for pattern recognition models. The models may have been trained to automatically discover the mismatch between the site plan, also called floorplan hereinafter or map information and the physical placement of the production line elements such as the workstations and the conveyors. This dynamically inferred parameter is then used to correct absolute location based control messages. Once the matching is available, the solution enables use cases normally defined in local coordinate systems such as relative to a robot workstation to use the measurements of a precise localization system, that is absolute e.g. for an entire site or building, directly or through a collective cloud service. However, it should be understood that the method and the device may be used outside a cloud environment, wherein the steps are carried out in a single entity or group of connected entities.

In the art, navigation algorithms are known which use satellite-based systems for outdoor navigation. Here a simple map matching problem occurs where the uncertain measurements place the receiver of the satellite signal somewhere randomly beside a given route in a map. In this case, the map matching algorithm finds the most appropriate place of the signal receiver device on the map, given the history and the properties of the map elements such as roads, sidewalks, buildings. It matches the uncertain location to the more and more certain map elements. In case of an industrial site, mainly in indoor locations, the situation is reversed, the localization of the receiver devices is of higher precision, but the site map itself contains the larger uncertainty.

In a factory setting such as shown in FIG. 1, different timescales of fixed and non-fixed positions can be identified. The workstations such as the workstations 51 or 52 of FIG. 2 can be considered stationary while the tags attached to the personal objects will represent a higher availability of the position during a map matching process. The traces of the objects are defined by a set of location and sensor measurements characterizing the tags trajectory in space and time. The tag is attached to a human being or an object.

Figure 4:
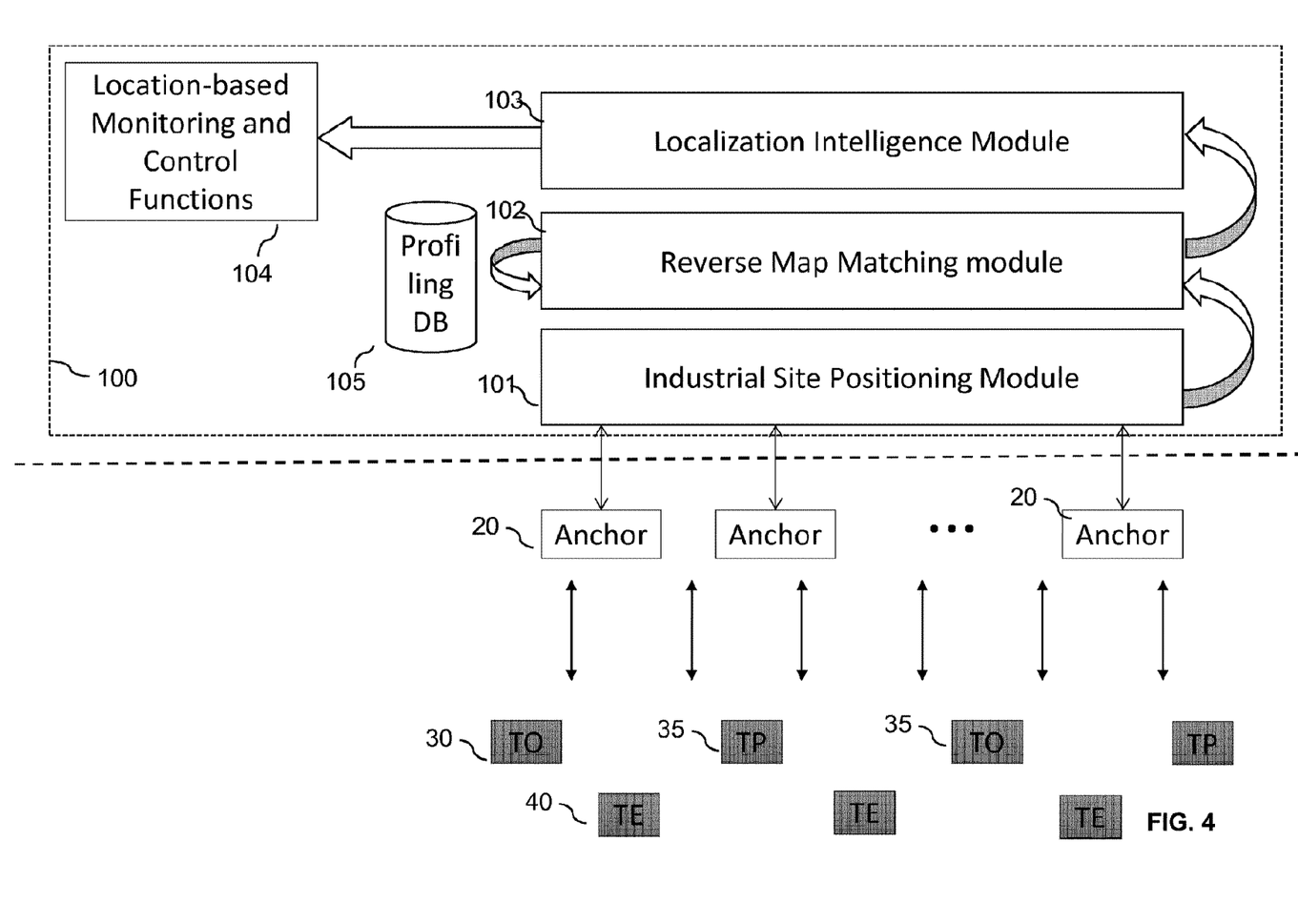
FIG. 4 shows a more detailed view of a system in which tags attached to different components send position information to the object control entity which determines adapted site plans using an absolute coordinate system for controlling objects.

FIG. 4 shows an example schematic representation of a site where a physical infrastructure is provided and stored at a manufacturing site shown in the lower part of FIG. 4 whereas an infrastructure, in the embodiment shown a cloud infrastructure shown in the upper part of FIG. 4, performs the absolute industrial site localization measurements, the map matching and the enhanced localization. The physical system shown below the dashed line in FIG. 4 comprises tags 30, 35 or 40 which are positioned via distance measurements to anchors 20. The tags can be attached to a person, such as tag 35, can be attached to an object going through a production line as shown by tag 30 or can be attached to a production line element as shown by tag 40. The anchors 20 have a known position and the anchors perform a distance measurement via tags and communicate with an entity 100 configured to control the handling of the object, wherein the object itself is not shown in FIG. 4, but may be any object that is passing through a production site. The anchors 20 send raw measurements data to entity 100 and receive anchor commands and tag commands that are forwarded to the tags. The industrial site positioning module 101 shown in FIG. 4 is controlling the physical localization infrastructure and creating the absolute tag positions in real time. A reverse map matching module 102 receives these positions, if the direct positions of the production line elements with the attached tags such as tag 40 are available, it can be used for direct map matching of the production line equipment. If they are not available, the position stream obtained by the tags 30 possibly lead together with the position stream of the tags attached to the persons, the tags 35, to the unknown equipment positions such as the positions of the workstations 51 and 52 shown in FIG. 2 and the production line routes in an absolute industrial site map which is generated as adapted site plan. A localization intelligence module 103 can then use the correct position information and can provide the adapted site plan with positions of the involved entities in an absolute coordinate system and the information is transmitted to the monitoring and control functions 104 which transmit control commands to the workstations 51 and 52 for controlling the operation of the workstations.

A profiling database 105 can collect the results of the adapted site plan and can collect partial production line routes. The modeling of the adapted map from the different elements of the production line can use hierarchical segmentation of the different functional units such as zones, production lines, production line segments as discussed below in connection with FIG. 5. Furthermore, the active elements of the production site can be continuously updated based on the current descriptor of the industrial site.

The traces as collected by the anchors are defined by a set of location and sensor measurements characterizing the trajectory of the tag in space and time. The collection time needed to create the trajectories as input for the reverse map matching can depend on the quality of the regular data set. Longer measurement periods can lower the overall uncertainty, and the tag positioning systems can provide the necessary information even from shorter measurement time. The distribution of the recorded movement types should be covered by diverse situations' representation. This can mean the following: A longer measurement period is only going to lower uncertainty in various scenarios if those scenarios are represented in the measurements, the distribution is not focused on repetitions of a restricted way of working of the complex system. Hence, it is preferable to cover the diversity of possible scenarios in these recordings.

Figure 5:
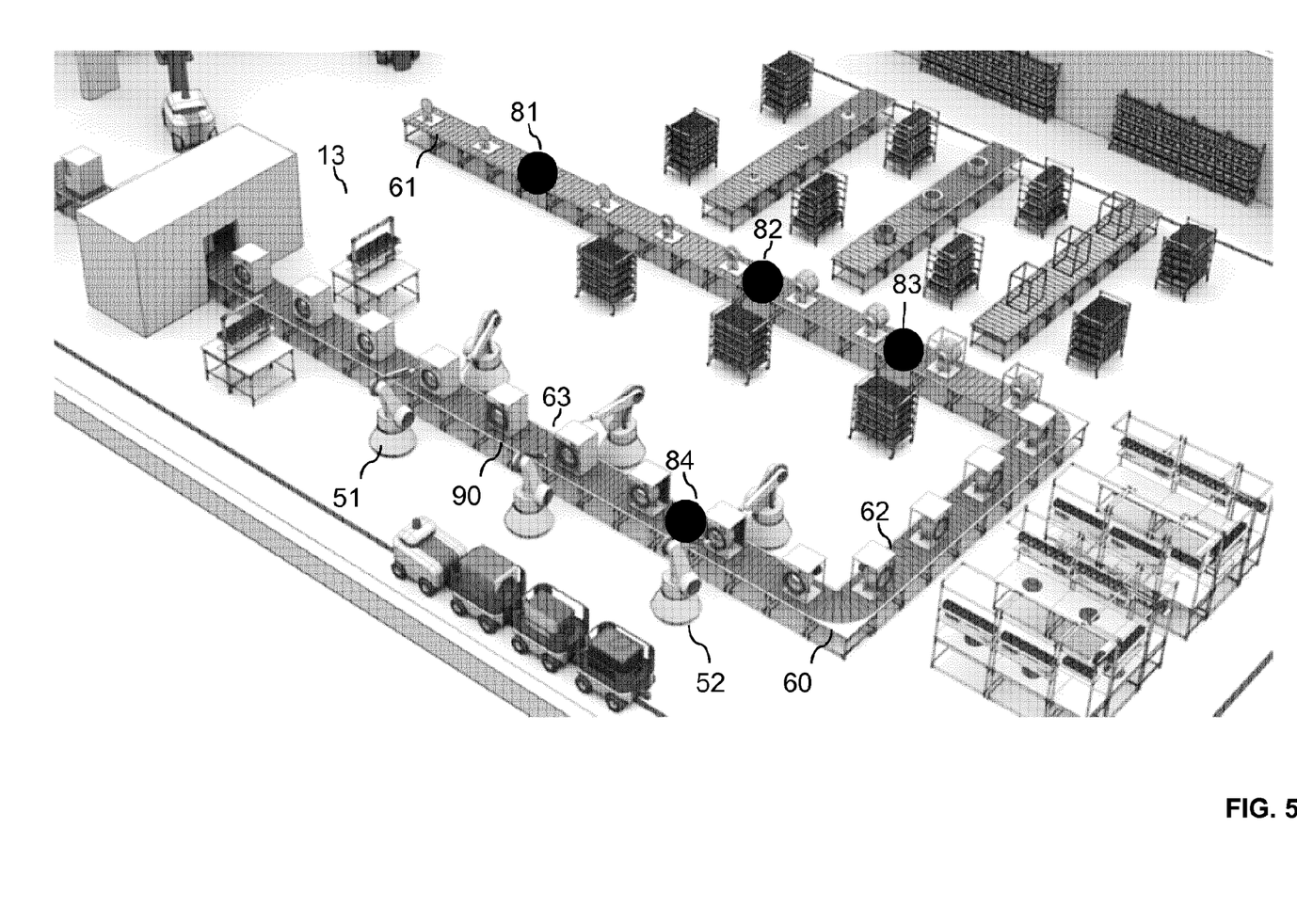
FIG. 5 shows a more detailed schematic view of the industrial site in which based on the adapted site plan the locations of the moving objects are correctly indicated.

In one scenario, the production line such as the production line 13 shown in FIG. 5 has a localization tag such as tag 40 of FIG. 4 which directly measures the position of the conveyer or production line which can be used to calculate the differential translation and rotation of the object for matching of the site plan to an absolute site coordinate system. As there is still a certain uncertainty in the determined positions, an additional optimization step can be included to minimize the overall error. The distance measurements between the anchors and the tag devices can include errors. Thus it could be necessary to further reduce the uncertainty by considering multiple anchor measurement and discarding outliers or by considering other known fixed distances e.g. between two tag devices.

In an optional step of the processing method, the whole production floor is separated into smaller portions or production line segments such as segments 61, 62 and 63 in FIG. 5 that have a fixed relative position to leverage the additional information that they are fixed to each other. Once these segments 61 to 63 are identified, they can be treated separately with an error minimization algorithm.

In another situation, the production line with the workstations and the conveyer elements do not have own localization tags, while the moving objects, the products, do have a localization tag. Using the traces of the movement of the objects determined based on the moving localization tags and based on prior knowledge of the factory plan, an adapted site plan can be generated. The matching/process can comprise the following steps:

1. In an initial phase, the known workstation types are recorded by trace characteristics or this information is used from available information which is known. Control of handling of a device is performed at the workstations. The tasks can range from robotic arm movements through manual handling or painting jobs. Dependent on the manufacturing processes, the information collected here creates a multi-dimensional trace including movement and other sensory information over the time the object spends at the station. These traces can be categorized and identify a given type of work station.

2. Furthermore, when the objects are handled by the workstation and the other elements present on the site such as the elements shown in FIGS. 4 and 5, the trajectory of the objects is recorded using the data of the tags attached to the objects and/or to the personnel working on the site.

3. In a third step, the workstation traces from the factory are identified by analyzing the movement of the trajectories and optionally by analyzing other sensory patterns of the object. Here a clustering algorithm may be used which is applied on the multidimensional time series trajectories or applied on the different time series segments as collected in step 2.

4. In an optional step, a higher-level sequence of workstation traces is identified in the records using hierarchical clustering methods. The hierarchical clustering can be performed over various dimensions. One option would be to create a hierarchy following units of the manufacturing processes. E.g., low-level movement patterns would constitute a workstation pattern, a given series of workstation patterns would constitute a given type of production line pattern, etc. . . .

5. In a further step, a matching of the workstation trace patterns or their optional sequences is carried out to the known site plan of the production site.

6. Here the coordinate system correction in a site plan is carried out by creating differential translation and rotation that is necessary for the reverse map matching of the site plan to the absolute site coordinate system. In this step, an adapted site plan is generated from the site plan which comprises all the positions in the absolute coordinate system. Accordingly, the entity 100 has now available the absolute positions of the moving objects as determined from the trajectories and an adapted site plan having the positions of the workstations and the objects in the absolute coordinate system.

7. Without redefining already implemented control processes, the calculated correction itself can then be adapted for each use case in the manufacturing control process to reach the respective necessary positioning accuracies. During the handling of an object in the manufacturing control processes various levels of positioning accuracy is required. If the accuracy reaches a given level, there is no need to redefine the control process itself, but e.g., the parameters used in their algorithmic coding can be adapted by inclusion of the calculated positioning mismatch correction value. This can be different in each of the use cases or processes involved.

In steps 3 and 5 mentioned above, an optimization method may be carried out as both the known site plan and the trace or trajectory measurements are usually noisy and can have additional local and global distortions such as distortions in the absolute site coordinate system. Here it is possible to apply numerical methods like gradient descent by simulated annealing to find a global minimum of the different function.

Step 7 can be solved on the fly and used as a dynamic cloud service. This step may be needed for the full integration of the localization system into a manufacturing process with the same ease of use.

In the industry 4.0 setting, where the mobility timescale of the stationary workstations is significantly reduced, the method may be repeated for each new installation in the site. This can be regarded as a continuous mode of operation of the reverse map matching as opposed to a single run mode of operation which is needed in a traditional set up where the setup of the site is not changed.

In a dynamic factory setting, the precise planning is often replaced by a loosely positioned functional areas. In such a situation, the proposed method can be used to discover the site plan with its active elements such as workstations by matching the trajectories of the elements to already known trace characteristics.

In one use case it is possible to consider the positioning within a single robotic cell, and only relative positions, such as the robotic arm's center, are used. Here every other aspect discussed above remains the same, but a higher accuracy may be needed for the smaller space to be matched. Here the different workstations relate to different joints of a robotic arm.

Figure 6:
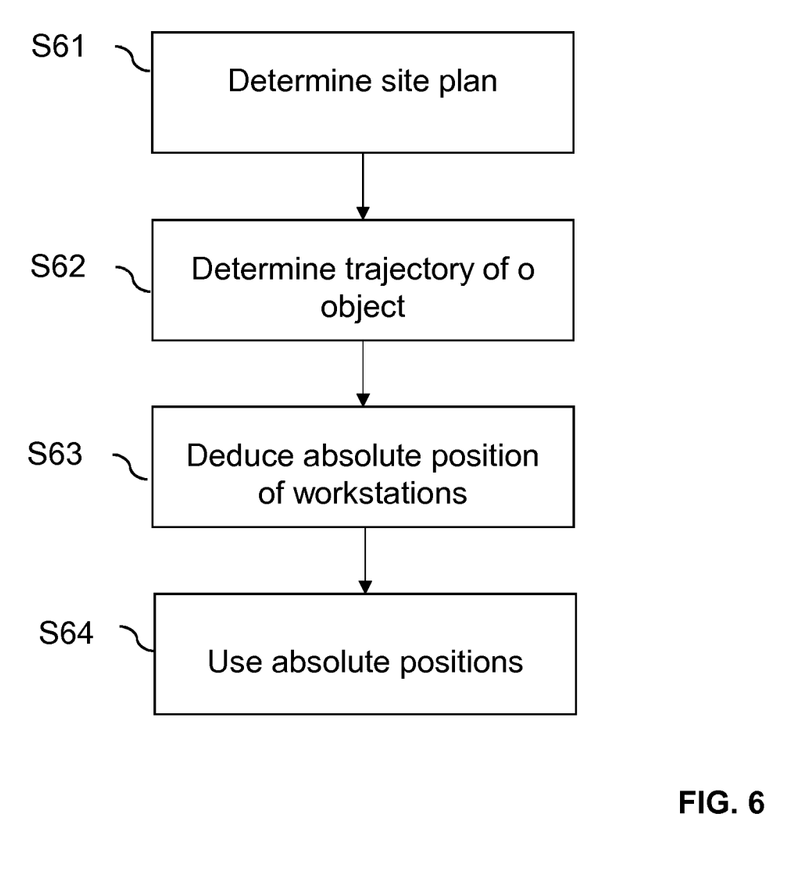
FIG. 6 shows a schematic example view of a flowchart of a method carried out at the object control entity when handling objects based on the absolute positions.

FIG. 6 shows a simplified flowchart of the main two components shown in FIG. 4 explaining where the different steps are carried out. The industrial site positioning module 101 uses a gateway for the command and measurement communication with the anchors. Accordingly, the gateway receives the distance measurements from the anchors and the raw measurements are then processed and the tag anchors distances as measured are converted into an absolute position of the tag e.g. also using the known positions of the anchors. In the reverse map matching module 102, the absolute tag positions are used to match the equipment of the production line to the absolute site coordinate system. The profiler, based on the historical records and based on the trajectory collection can determine when the object is handled by a workstation or when the object is handled by a conveyer. In terms of a machine learning framework, generally the system and method is trained e.g, on measurements, and once ready, the resulting model is used for automatic inference. In the case of the mismatch inference, the measurement traces are the input, and the inference uses the trained model to determine the correction value for the mismatched positioning to be used in the given control processes. The overall model training logics are detailed in the steps 1-6 of the factory plan matching details.

FIG. 5 shows a schematic view of the site after the correction of the site plan to the adapted site plan in which the positions of the objects such as the positions 81, 82, 83 or 84 are correctly indicated as being located on the conveyer belt. The positions of the workstations 51 and 52, as well as the position of the object 90 are all provided in the absolute coordinate system. Accordingly, it is possible to use the adapted site plan with the provided absolute coordinate system to control the handling of the object 90 by the conveyer 60 or the workstations 51 or 52. FIG. 5 furthermore shows the different sections 61 to 63 of the conveyer 60.

FIG. 6 summarizes some of the steps carried out at the object control entity. In step S61 the site plan is determined. This site plan is not provided in the absolute coordinate system so that it might not be used for controlling the objects handled on the site. In step S52 the trajectory of a first object is determined using at least the positions as tracked by the tags attached to the object. From the determined trajectory it is possible to deduce the absolute positions of the workstations at which the objects were manipulated or handled in a certain way. In this context, prior knowledge of the kind of workstations provided on the site may be used. By way of example, it may be known that the workstation carries out a pure translational movement or that the workstation is handling the object in a certain way, by gripping it and moving it to a different position. These movements can be easily identified in the trajectory of the object which is provided with a high precision. In step S63, the absolute position of the workstations are determined based on the detection of certain patterns in the movement of the objects. As the geometry of the workstation is precisely known, it is possible to determine an absolute position of the workstation based on the position and the evaluation of the position close to the workstation.

In step S64, when the absolute position of the workstation is known, it can be used for controlling the handling of the same or further objects handled at the corresponding workstations.

Figure 7:
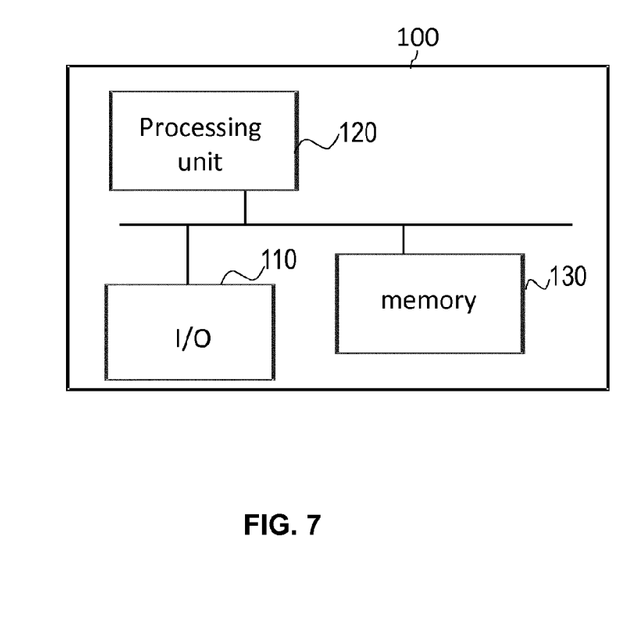
FIG. 7 shows an example schematic representation of the object control entity configured to handle moving objects in a site based on an absolute coordinate system.

FIG. 7 shows a schematic architectural view of the object control entity carrying out the above-discussed handling of objects based on absolute positions of the workstations. The entity 100 comprises an interface or input-output 110 provided for transmitting user data or control messages to other entities. The interface 110 is especially configured to receive the trajectories of the object and after the absolute position and the adapted site plan has been calculated the interface 110 can output control commands to the workstations that are needed to handle the objects. The entity 100 furthermore comprises a processing unit 120 which is responsible for the operation of the entity 100. The processing unit 120 can comprise one or more processors and can carry out instructions stored on one or more memories 130, wherein the memory may include a read-only memory, a random access memory, a mass storage, a hard disk or the like. The memory can furthermore include suitable program code to be executed by the processing unit 120 so it is to implement the above-described functionalities in which entity 100 is involved. The entity 100 can be implemented as a single standalone entity or may be implemented in a cloud environment in which the processing unit and the memories and the interfaces are distributed in a cloud environment.

Figure 8:
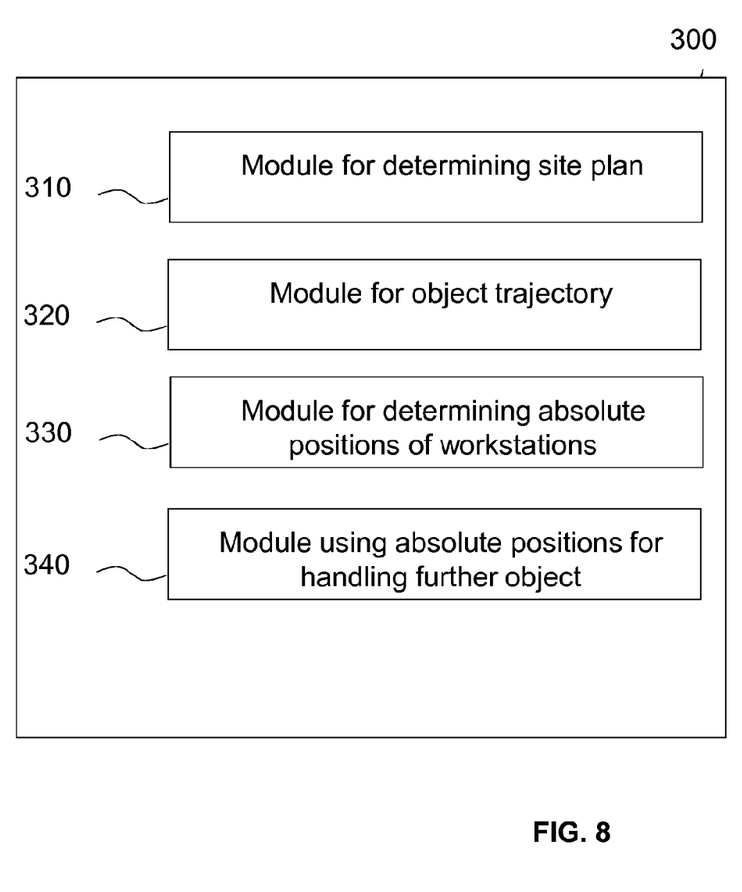
FIG. 8 shows another example schematic representation of the object control entity shown in FIG. 7.

FIG. 8 shows a further schematic architectural view of an entity 300 configured to control the handling of objects based on absolute positions of the workstations and based on an adapted site plan. The module 300 comprises a first module 310 configured to determine the site plan which comprises the positions of the workstation and other installations on the site. Furthermore, a module 320 is provided configured to determine the object trajectory in an absolute coordinate system based on the raw measurements as received from the moving objects. A third module 330 is provided configured to determine the absolute positions of the workstation based on an analysis of the trajectory of the object. When the absolute positions of the workstations are known, these absolute positions can be used by a module 340 for handling objects by the workstation and by controlling the handling using control commands.

From the above said some general conclusions can be drawn.

When the absolute positions of the at least two workstations are known it is possible to match the predefined positions of the workstations in the site plan to the absolute positions and to determine an adapted site plan of the site based on the matching. This adapted site plan then comprises the absolute positions of the at least two workstations in the absolute coordinate system. The adapted site plan and the absolute positions of the components on the site can be used for controlling the handling of one or several further objects.

A conveyer 60 can be provided to move the objects from one of the workstations to the other of the at least two workstations. When the trajectory of the first object is determined an absolute conveyer trajectory can be determined comprising the positions of objects moving between the two workstations in the absolute coordinate system. When the trajectory is determined an absolute workstation trajectory may be determined for each of the workstations comprising the positions of the objects during the manipulation at the corresponding workstation in the absolute coordinate system. The conveyer trajectory and the absolute workstation trajectory can then be used for controlling the handling of the at least one further object.

The absolute site plan can then also comprise the absolute conveyer trajectory in addition to the absolute workstation trajectory.

The trajectory of the first object can be determined based on a localization tag attached to the object. However, other options for precise determination of the positions may be used.

The absolute workstation trajectory may be determined by analyzing the determined trajectory of the first object by deducing workstation induced movements in the trajectory of the first object. Each workstation has its own specific movement when handling objects. One workstation may be a test workstation where the object is located at a defined fixed position for a predetermined amount of time, wherein another workstation may be a workstation where parts are added to the object or where parts are removed from the object so that specific movements are carried out with the object. As these movements are known in a 3D environment from the trajectories, it is possible to clearly separate the trajectory initiated by a manipulation of a workstation from other trajectories.

Furthermore, control commands for the at least one further object can be determined which can be used at one of the workstations to manipulate the at least one further object. Furthermore, the control commands can be transmitted to said workstation for the manipulation of the further objects to be handled by the corresponding workstation.

The at least two workstations 51 and 52 can be part of a production line of the site, wherein the trajectory of the object is analyzed and different line segments are determined within the production line, wherein a relative distance between the different segments is determined in the absolute coordinate system and used in controlling the handling of the object. By way of example, in the embodiment shown in FIG. 4 the production line may be separated into different line segments such as a first segment 61 in which the objects located on the conveyer belt are conveyed in one direction. A further segment may be segment 62 perpendicular to the first segment and a further line segment may be segment 63 which is again perpendicular to line segment 62 and parallel to line segment 61. The relative distance between the different segments can be determined in the absolute coordinate system and used in the controlling.

Accordingly, it is possible to determine a conveyer trajectory and an absolute workstation trajectory separately for each line segment such as the different segments 61 to 63 shown in FIG. 5.

Furthermore, it is possible to determine the trajectories of the users moving at the site. The absolute positions of the workstations can also be determined taking into account the determined trajectories of the users.

For the determination of the absolute positions of the at least two workstations a clustering mechanism may be used which is applied on the determined trajectory of the first object.

Furthermore, an optimization process may be used which finds a minimum or maximum in order to obtain the absolute workstation trajectory. As each of the determined positions of the first object is determined with a certain precision, the determination of the absolute positions can include an optimization algorithm which finds an absolute minimum or maximum in order to determine the absolute workstation trajectory.

The above-discussed solution provides a mechanism able to bridge the gap between industrial location based control and precise positioning systems. Both systems rely on the industrial site map or site plan. Once there is a mismatch between the site plan and the real physical layout of the workstations or production lines, the mismatch renders the positioning system incompatible with the control functions. The above-discussed solution automatically corrects this mismatch and determines an adapted site plan.

To solve this reverse map matching requirement and for integrating the solution into an industrial site monitoring and real-time manufacturing control functions, a system of physical components and cloud components may be used.

The solution above generates the necessary corrections for the position automatically and on the fly to avoid a costly and time-consuming process of repeatedly needed site calibration.

The method identifies precise positions in an absolute coordinate system of characteristic locations and matches them to coordinates used by the entity controlling the different components, i.e. the map coordinates.

In case it is where a floor plan is available, the correction is calculated for each production line element from the input of sensory and absolute location measurement traces of objects and personal to be tracked.

Machine learning algorithms may be used for pattern recognition for the building of a profiling knowledge base that can be used on the fly to calculate the respective and reverse map matching correction factor for the local control functions.

Numerical optimization methods may be used to reduce uncertainty, and higher-level factory plan units are leveraged in the matching algorithms. The solution above can also be used in flexible industrial sites where the continuous monitoring of the floor plan or site plan can be used for different use cases.

In a flexible site, the new installing of a production line becomes possible. Furthermore, the reorganization of the site can be implemented such that the adapted site plan is used for controlling the movements of the object. The above-discussed solution provides the following options:

The correction of the unmatched site plan which would otherwise render the localization system unusable can be now used in solutions relying on tasks defined on the map such as geofence alarms and mode of operation settings for certain geolocations. The solution provides a high-level accuracy in a precise localization system and allows the integration of the absolute localization system to control functions where commands and algorithms can rely on the near real-time measurement streams with on-the-fly correction.

Continuous manufacturing with precise mapping of production lines becomes possible without additional, repeated calibration of the localization system or of the production lines. The adapted site plan can be used for mapping new installations and can be used for the manufacturing process. No extra precision requirements are needed for the absolute positions of the production line. Accordingly, a cost-effective way for the mapping of the production equipment is provided without the need of extra work. The method can use either direct measurements of the workstations if available or the indirect position information as deduced from the trajectories as determined for the objects moving in the site. The flexibility is increased as there is no need for a precise site plan in advance as this precise site plan is generated.

The invention claimed is:

1. A method for controlling a handling of a further object which is handled at a site by at least two different workstations and which is moved between the at least two different workstations,
   determining a site plan of the site, the site plan indicating the at least two workstations at predefined positions in the site plan,
   determining a trajectory of a first object moving in the site in an absolute coordinate system of the site,
   deducing absolute positions of the at least two workstations in the absolute coordinate system from the determined trajectory of the first object,
   using the absolute positions of the at least two workstations for controlling the handling of the at least one further object handled by the at least two workstations,
   wherein a conveyer is provided to move the first object from one of the at least two workstations to another of the at least two workstations, wherein determining a trajectory comprises determining an absolute conveyor trajectory comprising positions of the first object moving between the two workstations in the absolute coordinate system and comprises determining an absolute workstation trajectory for each of the at least two workstations comprising positions of the first object during manipulation at the corresponding workstation in the absolute coordinate system, wherein the conveyer trajectory and the absolute workstation trajectory are used for controlling the handling of the at least one further object.

2. The method according to claim 1, further comprising:
   matching the predefined positions of the at least two workstations in the site plan to the absolute positions of the at least two workstations,
   determining an adapted site plan of the site based on the matching, the adapted site plan comprising the absolute positions of the at least two workstations in the absolute coordinate system,
   using the adapted site plan for controlling the handling of at least one further object.

3. The method according to claim 1, wherein the absolute site plan is determined comprising the absolute conveyer trajectory.

4. The method according to claim 1, wherein the trajectory of the first object is determined based on a localization tag attached to the first object.

5. The method according to claim 1, wherein the absolute workstation trajectory is determined by analyzing the determined trajectory of the first object and by deducing workstation induced movements in the trajectory of the first object.

6. The method according to claim 1, wherein using the absolute positions comprises
   determining control commands for the at least one further object used at one of the at least two workstations to manipulate the at least one further object,
   transmitting the control commands to said one workstation.

7. The method according to claim 1, wherein the at least two workstations are part of a production line, wherein the trajectory of the first object is analyzed and different line segments are determined within the production line, wherein a relative distance between the different segments is determined in the absolute coordinate system and used in the controlling of the handling.

8. The method according to claim 1, wherein the conveyer trajectory and absolute workstation trajectory are determined separately for each line segment.

9. A non-transitory computer-readable medium storing thereon program code to be executed by at least one processing unit of an object control entity, wherein execution of the program code causes the at least one processing unit to perform the method of claim 1.

10. An object control entity configured to control a handling of a further object which is handled at a site by at least two different workstations and which is moved between the at least two different workstations, the object control entity comprising a memory and at least one processing unit, the memory containing instructions executable by said at least one processing unit, wherein the object control entity is operative to:
  determine a site plan of the site, the site plan indicating the at least two workstations at predefined positions in the site plan,
  determine a trajectory of a first object moving in the site in an absolute coordinate system of the site,
  deduce absolute positions of the at least two workstations in the absolute coordinate system from the determined trajectory of the first object,
  the absolute positions of the at least two workstations for controlling the handling of the at least one further object handled by the at least two workstations,
  wherein a conveyer is provided to move the first object from one of the at least two workstations to another of the at least two workstations, wherein the object control entity, for determining a trajectory, is operative to determine an absolute conveyor trajectory comprising positions of the first object moving between the two workstations in the absolute coordinate system and operative to determine an absolute workstation trajectory for each of the at least two workstations comprising positions of the first object during manipulation at the corresponding workstation in the absolute coordinate system, and to use the conveyer trajectory and the absolute workstation trajectory for controlling the handling of the at least one further object.

11. The object control entity according to claim 10, further being operative to
  match the predefined positions of the at least two workstations in the site plan to the absolute positions of the at least two workstations,
  determine an adapted site plan of the site based on the matching, the adapted site plan comprising the absolute positions of the at least two workstations in the absolute coordinate system,
  use the adapted site plan for controlling the handling of at least one further object.

12. The object control entity according to claim 10, further being operative to determine the absolute site plane comprising the absolute conveyer trajectory.

13. The object control entity according to claim 10, further being operative to determine the trajectory of the first object based on a localization tag attached to the first object.

14. The object control entity according to claim 10, further being operative to determine the absolute workstation trajectory by analyzing the determined trajectory of the first object and by deducing workstation induced movements in the trajectory of the first object.

15. The object control entity according to claim 10, further being operative, when using the absolute positions, to determine control commands for the at least one further object used at one of the at least two workstations to manipulate the at least one further object and to transmit the control commands to said one workstation.

16. The object control entity according to claim 10, wherein the at least two workstations are part of a production line, the object control entity being operative to analyze the trajectory of the first object, to determine different line segments within the production line, and to determine a relative distance between the different segments in the absolute coordinate system used in the controlling of the handling.

17. The object control entity according to claim 10, further being operative to determine the conveyer trajectory and absolute workstation trajectory separately for each line segment.

18. The object control entity according to claim 10, further being operative to determine trajectories of users moving at the site, and to determine the absolute positions of the at least two workstations taking into account the determined trajectories of the user.

19. The object control entity according to claim 10, further being operative, for determining the absolute positions of the at least two workstations, to use a clustering mechanism on the determined trajectory of the first object.

20. The object control entity according to claim 10, further being operative, for determining the absolute workstation trajectory, to use an optimization process in which a minimum or maximum is found.

* * * * *